(12) United States Patent
Blatter et al.

(10) Patent No.: US 6,531,189 B1
(45) Date of Patent: Mar. 11, 2003

(54) METHOD FOR HARDENING POWDER COATINGS

(75) Inventors: Karsten Blatter, Erftstadt (DE); Olaf Thiele, Landshut (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/831,674

(22) PCT Filed: Nov. 5, 1999

(86) PCT No.: PCT/EP99/08504

§ 371 (c)(1),
(2), (4) Date: Jul. 20, 2001

(87) PCT Pub. No.: WO00/29491

PCT Pub. Date: May 25, 2000

(30) Foreign Application Priority Data

Nov. 13, 1998 (DE) .......................................... 198 52 268

(51) Int. Cl.⁷ .................................................. C08J 7/18
(52) U.S. Cl. ....................... 427/514; 427/508; 427/180; 427/201
(58) Field of Search ................................ 427/508, 512, 427/514, 595, 180, 189, 195, 201, 557, 559; 106/400, 461, 472

(56) References Cited

U.S. PATENT DOCUMENTS 4,480,008 A * 10/1984 Farronato et al. ............ 427/195
4,892,599 A * 1/1990 Marwick .................. 156/275.3

FOREIGN PATENT DOCUMENTS

| DE | 4230229 A1 | 3/1994 |
| DE | 4313762 C1 | 4/1994 |
| EP | 300818 A | 1/1989 |
| JP | 59016571 A | 1/1984 |
| JP | 07070548 A | 3/1995 |

* cited by examiner

*Primary Examiner*—Michael Barr
*Assistant Examiner*—Rebecca A. Blanton

(57) ABSTRACT

Process for curing powder lacquers by coating substrates with the powder lacquers and irradiating by radiation in the near infrared range (NIR radiation), which is characterized in that the curing times and/or the surface temperatures, obtainable by means of the radiation during certain curing times, of the substrates coated with the powder lacquers are controlled by setting the barium sulfate and/or aluminium oxide content of the powder lacquers to 1 to 50 wt. % and/or setting the carbon black content of the powder lacquers to 0.1 to 5 wt. %, the percentages by weight relating to the entire powder lacquer composition in each case.

5 Claims, No Drawings

METHOD FOR HARDENING POWDER COATINGS

BACKGROUND OF THE INVENTION

The invention relates to the curing of powder lacquers on metallic and non-metallic substrates by irradiation with radiation from the near infrared range (NIR radiation).

In the coating of metals the decorative or functional coating of surfaces with powder lacquers has acquired a wide field of application because of the high efficiency of the process and the favourable assessment from the point of view of environmental protection. Numerous powder lacquer formulations have been developed for the various fields of use. The powder lacquer curing processes available hitherto require the powder deposited on the substrate initially to be melted by heating to temperatures above the glass transition temperature and/or melting point of the powder lacquer formulation. Convection ovens, infrared radiators or combinations of both are used as heat sources, for example. For heat-curing systems the powder coating is typically cured by heating the entire object to be coated to temperatures between 140 and 200° C. for a period of approx. 10 to 30 minutes.

For UV-curing powder lacquer formulations, the powder coat melted in conventional manner is cured within a few seconds with the aid of ultraviolet radiation. The powder lacquers are usually cured via the polymerization of double bonds or cyclic ethers according to radical or cationic reaction mechanism.

Both processes have considerable disadvantages. High temperatures are required over a period of approx. 20 to 30 minutes for heat-curing powder lacquers; on the one hand these high temperatures do not permit coating of temperature-sensitive surfaces such as wood or plastic and on the other hand they require a considerable amount of energy for metal components. The use of UV-curing powder lacquers requires two process steps, since first of all the powder must be melted by heating and then be cured with UV radiation in a second step. Furthermore it is difficult to cure pigmented powder lacquers in larger coating thicknesses as the UV radiation is absorbed by the components which impart colour and this renders complete curing of the coating more difficult.

The recently developed technology for generating high-intensity radiation in the near infrared range (NIR), the wavelength range from 750 to 1200 nm, offers a further possibility for curing lacquer compositions. The NIR radiation intensity employed in the field of analytical chemistry or process control is not, however, sufficient to heat the substrate or start chemical reactions, such as the crosslinking of a lacquer.

The article "Sekundenschnelle Aushärtung von Pulverlack" ("Curing powder lacquer in seconds") (Kai Bär, JOT 2/98) describes that powder lacquers may be cured with the aid of high-intensity NIR radiation without the substrate being substantially heated. NIR technology enables powder lacquers to be melted and cured in a single process step without the drawbacks of conventional thermal curing and/ or UV curing described above. A uniform heating of the entire lacquer coat and a reflection of the radiation on metallic surfaces are achieved. Powder lacquers which are particularly suitable for this curing process and in particular the way in which tailor-made powder lacquers for curing with the aid of NIR radiation may be developed are not described.

German patent application 198 06 445.4 describes powder lacquer binders which are particularly suitable for curing powder lacquers by means of NIR radiation. The absorption behaviour of powder lacquers which are produced with these binders, and the influence of the absorption behaviour on the curing characteristics and the coating properties are not mentioned therein.

In particular, pigmented powder lacquers with the same binder system but different composition of the remaining constituents may exhibit considerable differences in absorption behaviour in NIR curing. Different rates of heating of the lacquer film and different curing speeds are observed in identical conditions as regards radiation intensity and irradiation time. For example, a conventional commercial white powder lacquer (Durotherm AL93-9010, Herberts Pulverlack GmbH) corresponding to the prior art is completely cured in 30 seconds when irradiated with a conventional commercial NIR radiation source (obtainable from Messrs Industrie SerVis) whereas a conventional commercial black powder lacquer with the same binder basis (Durotherm AL93-9017, Herberts Pulverlack GmbH) corresponding to the prior art achieves a curing time of 5 seconds in the same irradiation conditions.

SUMMARY OF THE INVENTION

The object of the invention is therefore to provide a process for curing powder lacquers which makes it possible to cure powder lacquers with the aid of NIR radiation irrespective of the colour or of the binder system used and further lacquer components with virtually identical curing times and surface temperatures of the substrates. Furthermore it should be possible to adjust the absorption behaviour of powder lacquers in the NIR range so as to be able to adapt the absorption characteristics to the desired application conditions such as the film thickness or the substrate to be coated for example.

In the context of the invention it has been shown that the absorption behaviour of a powder lacquer composition may be changed and/or adapted in order to achieve desired conditions by varying its barium sulfate and/or aluminium oxide and/or carbon black content.

The invention therefore provides the use of barium sulfate, aluminium oxide and/or carbon black to control the absorption behaviour of powder lacquers on curing with radiation in the near infrared range (NIR radiation), particularly the control of the curing times and/or the surface temperatures of substrates coated with the powder lacquers.

The invention further provides a process for curing powder lacquers by coating substrates with the powder lacquers and irradiating by radiation in the near infrared range (NIR radiation), which is characterized in that the curing times and/or the surface temperatures, obtainable by means of the radiation during certain curing times, of the substrates coated with the powder lacquers are controlled by setting the barium sulfate and/or aluminium oxide content of the powder lacquers to 1 to 50 wt. % and/or setting the carbon black content of the powder lacquers to 0.1 to 5 wt. %, the percentages by weight relating to the entire powder lacquer composition in each case.

The procedure according to the invention is that the total barium sulfate and aluminium oxide content in the powder lacquers does not exceed 50 wt. %, if carbon black is additionally present the total barium sulfate and/or aluminium oxide content together with carbon black not exceeding 55 wt. %.

DETAILED DESCRIPTION OF THE INVENTION

The barium sulfate and/or aluminium oxide and/or carbon black content crucially influences the absorption behaviour of the entire powder lacquer composition and enables the NIR curing characteristics to be set for a specific purpose. By means of an increased barium sulfate and/or aluminium oxide and/or carbon black content, for example, the absorption capacity of the powder lacquer composition for radiation in the NIR wavelength range may rise greatly, and in constant radiation conditions higher surface temperatures and shorter curing times may be achieved.

Furthermore the absorption behaviour of the powder lacquer compositions may be adapted to the particular application of the powder lacquer. Depending on the substrate it may, for example, be desirable to increase the absorption of the radiation in the lacquer film in order to minimise the heating of the substrate. In these cases formulations, the barium sulfate and/or aluminium oxide and/or carbon black content of which is increased, in the upper range of the quantities quoted above (wt. %) for example, are preferred.

For very thick powder lacquer coatings it may be necessary to reduce the NIR absorption so as to ensure that the deeper-lying powder coat melts and cures. If the NIR absorption is too high all the radiation will be absorbed on the surface of the lacquer film, which leads to a poor flow and an incomplete curing of the coating on the surface of the substrate.

Powder lacquer compositions, the barium sulfate and/or aluminium oxide and/or carbon black content of which is reduced, to the lower range of the quantities quoted above (wt. %) for example, are suitable for such applications.

For thin coats a high NIR absorption of the powder lacquer composition may be desirable in order to be able to achieve as high as possible a heating and curing speed, so that an increased barium sulfate and/or aluminium oxide and/or carbon black content is used.

According to the invention the use of barium sulfate and/or aluminium oxide with a content of 1 to 50 wt. %, particularly 5 to 35 wt. %, and/or carbon black with a content of 0.1 to 5 wt. %, related to the entire powder lacquer composition in each case, is suitable for setting the powder lacquer composition according to the invention.

It has been shown that barium sulfate and/or aluminium oxide and/or carbon black may be used irrespective of their modification, the size of the particles and further optionally present differences in structure and constitution.

The remaining powder lacquer constituents such as resins, pigments and additives for example, also contribute towards the NIR absorption behaviour of the overall composition although this contribution is distinctly smaller than the contribution of the barium sulfate and/or aluminium oxide and/or carbon black content according to the invention.

If the starting point is powder lacquers which already contain barium sulfate, aluminium oxide and/or carbon black, the change in the barium sulfate and/or aluminium oxide and/or carbon black content in the powder lacquer compositions may also be compensated by other pigments and/or fillers. To extend the curing time, for example, barium sulfate and/or aluminium oxide contents may be partially replaced by other fillers which exhibit very low absorption of NIR radiation. Such pigments and/or fillers may be calcium carbonate, titanium dioxide, aluminium hydroxide, dolomite and talc for example.

If the barium sulfate and/or aluminium oxide content is changed it may optionally also be necessary to adapt the pigmenting to compensate for slight colour shifts. A change in the carbon black content may lead to quite large changes in colour.

Further constituents which the powder lacquers according to the invention may contain are the conventional binder/hardener systems such as polyester resins with low-molecular epoxy or hydroxyalkylamide hardeners, epoxy/polyester hybrid systems, epoxy resins with dicyanodiamide hardeners, carboxylic acid hardeners or phenolic hardeners, or also epoxy functionalized acrylate resins with carboxylic acid or carboxylic anhydride hardeners as well as conventional pigments and/or fillers and conventional additives such as flow-control agents, degassing auxiliary substances, texturing agents, for example. The conventional organic or inorganic pigments may be used to pigment the powder lacquer formulations according to the invention.

The powder lacquers usable according to the invention may be produced in conventional manner; the barium sulfate, aluminium oxide and/or carbon black additions may be mixed with the remaining powder constituents in conventional manner or be incorporated into powder constituents, such as binders and/or hardeners for example.

The powder may be applied to the substrate to be coated by known electrostatic spray methods with the aid of Corona or Tribo spray guns for example or with other suitable processes for powder application.

For curing, the applied powder lacquer composition may be irradiated for example with the aid of a conventional high-energy NIR radiator, e.g. with a radiator surface temperature of the incandescent coils between 2000 and 3000 K; radiators whose emission spectrum has a maximum between 750 and 1200 nm are suitable for example; the output is more than 1 $W/cm^2$ for example, preferably more than 10 $W/cm^2$; the irradiation time is 1 to 300 seconds for example. On irradiation the powder first melts and then cures, for example in a period of 1 to 300 seconds.

For curing it is also possible to use a combination of NIR radiators and conventional heat sources such as convection ovens or infrared radiators. If required it is also possible to achieve a uniform irradiation of three-dimensional objects with the aid of reflectors for NIR radiation.

The process according to the invention is particularly suitable for coating temperature-sensitive substrates for the coating of large, solid structural components or for coating tasks for which a high curing speed is required. Examples of temperature-sensitive substrates are natural wood or wood-based material surfaces, plastics surfaces or metal parts which contain further heat-sensitive components such as liquids or lubricants. Conventional metal substrates can also be coated.

In particular, functional coatings on pipes, metal components for concrete reinforcement or structural components may also take place as well as coatings on components with a large surface area which cannot be heated in an oven, such as steel structures, bridges, ships.

The process according to the invention may also be used for the coil coating process with coating speeds of >100 m/min.

The process according to the invention makes it possible to set the absorption behaviour of powder lacquers and hence in particular to achieve a controllable curing behaviour of the powder lacquers and controllable surface temperatures of the coated substrates. Powder lacquers with different colours or binder systems may be cured by NIR radiation in identical conditions, by which means considerable advantages for the processor of powder lacquers when using different powder lacquers in a coating plant are gained. It is, for example, thus possible to change a colour quickly during powder processing without the need for complicated adaptation of the plant parameters such as curing time or intensity of the radiation source to suit the colour.

The powder lacquers modified with barium sulfate, aluminium oxide and/or carbon black used in the process according to the invention may be used advantageously for the curing process by means of NIR radiation and produce coatings of outstanding quality.

The examples which follow illustrate the invention:

The powder lacquer formulations listed in the Tables were converted into coating powders by the processes conventional to powder lacquer production by intensive mixing of the components, extruding and grinding. The powders were electrostatically applied in an identical film thickness to test sheets of aluminium using a Corona powder spray gun. Curing took place on a coil line which is equipped with an NIR radiator with an output of 400 kW/m² maximum supplied by Messrs Industrie SerVis. The radiation intensity and the distance between the radiator and the surface of the substrate were kept constant. The irradiation time was varied by changing the coil speed. The Tables quote the irradiation time which corresponds to the coil speed at which the coating is completely cured (curing time). The mechanical properties and solvent resistance were measured as a criterion of curing and were compared with samples of the same formulation stoved in the circulating air oven at high temperatures in conventional manner. The curing times quoted in the Table correspond to the coil speed at which the properties of the reference sample were obtained.

Within the individual binder systems the constituents of the formulations were kept constant to a large extent. The variation in the barium sulfate, aluminium oxide and carbon black content was made by interchanging titanium dioxide in the formulation so that the concentration of the remaining main components could be kept constant. All quantities are quoted in wt. %.

Formulations not according to the invention are marked with an asterisk. Experiments in which no curing was achieved are marked 'n.c.'. In this case, flow problems or blistering took place at excessively long irradiation times without the film curing.

EXAMPLE 1

Outdoor weathering-resistant powder lacquers based on polyester with Araldit PT 910 (Ciba Chemicals).

All formulations contain 57% polyester resins, 5.2% Araldit PT 910 hardener and 4.5% flow-control and degassing agents. The red powder lacquers were pigmented with 1% of an inorganic red pigment, the yellow powder lacquers with 2% of an inorganic yellow pigment.

Table to Example 1

| No. | Colour | Barium sulfate content (wt. %) | Aluminium oxide content (wt. %) | Titanium dioxide content (wt. %) | Curing time [s] |
|---|---|---|---|---|---|
| 1.1* | yellow | 0 | 0 | 31 | n.c. |
| 1.2 | yellow | 13 | 0 | 18 | 12 |
| 1.3 | yellow | 26 | 0 | 5 | 9 |
| 1.4 | yellow | 31 | 0 | 0 | 8 |
| 1.5* | red | 0 | 0 | 33.2 | n.c. |
| 1.6 | red | 16 | 0 | 17.2 | 10 |
| 1.7 | red | 24 | 0 | 9.2 | 9 |
| 1.8 | red | 33.2 | 0 | 0 | 8 |
| 1.9 | yellow | 0 | 20 | 11.3 | 12 |

EXAMPLE 2

Powder lacquers based on epoxy resin.

All formulations contain 60% epoxy resin, 3.3% dicyanodiamide hardener and 1.4% degassing agent and flow-control agent.

Table to Example 2

| No. | Colour | Barium sulfate content (wt. %) | Titanium dioxide content (wt. %) | Carbon black content (wt. %) | Curing time [s] |
|---|---|---|---|---|---|
| 2.1* | white | 0 | 35.3 | 0 | n.c. |
| 2.2 | white | 20 | 15.3 | 0 | 13 |
| 2.3 | white | 35.3 | 0 | 0 | 10 |
| 2.4 | grey | 35 | 0.2 | 0.1 | 3.5 |
| 2.5 | grey | 25 | 10.2 | 0.1 | 3.7 |
| 2.6 | grey | 15 | 20.2 | 0.1 | 4 |
| 2.7 | grey | 0 | 34.3 | 1 | 5 |

EXAMPLE 3

Powder lacquers based on polyester/epoxy hybrid binder

All formulations contain 40.4% polyester resin, 18% epoxy resin, 1.6% flow-control and degassing agents and 3% organic blue pigment.

Table to Example 3

| No. | Colour | Barium sulfate content (wt. %) | Titanium dioxide content (wt. %) | Curing time [s] |
|---|---|---|---|---|
| 3.1* | blue | 0 | 37 | n.c. |
| 3.2 | blue | 15 | 22 | 9 |
| 3.3 | blue | 35 | 2 | 7 |

What is claimed is:

1. A process for curing powder lacquer coatings which comprises
    A) applying a layer of the powder lacquer to a substrate and
    B) curing said layer of powder lacquer with near infrared radiation having a wavelength of 750–1200 nm (NIR radiation) to form a coating;
wherein the curing times and the surface temperatures of the substrate are controlled by the amount of additive content and the carbon black content of the powder lacquer and wherein said powder lacquer contains 1–50 wt. %, based on the weight of the powder lacquer, of an additive selected from the group consisting of aluminum oxide, barium sulfate and any mixtures thereof and 0.1 to 5 wt. %, based on the weight of the powder lacquer, of carbon black.

2. The process according to claim 1 in which the powder lacquer contains 5 to 35 wt. %, based on the weight of the powder lacquer, of the additive.

3. The process according to claim 1 wherein NIR radiation and curing occur in a period of 1 to 300 seconds.

4. The process according to claim 2 wherein NIR radiation and curing occur in a period of 1 to 300 seconds.

5. A powder lacquer comprising a film forming binder component and 1 to 50 wt. %, based on the weight of the powder lacquer, of an additive selected from the group consisting of barium sulfate, aluminum oxide and any mixtures thereof and 0.1 to 5 wt. %, based on the a weight of the powder lacquer, of carbon black;
    wherein the additive and the carbon black control the absorption behavior of the powder lacquer when cured with NIR radiation having a wavelength of 750–1200 nm.

* * * * *